US007321895B2

(12) United States Patent
Dettinger et al.

(10) Patent No.: US 7,321,895 B2
(45) Date of Patent: Jan. 22, 2008

(54) TIMELINE CONDITION SUPPORT FOR AN ABSTRACT DATABASE

(75) Inventors: Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 11/035,710

(22) Filed: Jan. 14, 2005

(65) Prior Publication Data

US 2006/0161523 A1    Jul. 20, 2006

(51) Int. Cl.
G06F 17/00 (2006.01)
G06F 17/30 (2006.01)
(52) U.S. Cl. .............................. 707/101; 707/3; 707/4
(58) Field of Classification Search ..................... None
See application file for complete search history.

(56) References Cited

U.S. PATENT DOCUMENTS

| 6,647,382 | B1 * | 11/2003 | Saracco | ........................ 707/3 |
| 6,725,227 | B1 | 4/2004 | Li | |
| 2003/0169284 | A1 * | 9/2003 | Dettinger et al. | ........... 345/708 |
| 2006/0095457 | A1 * | 5/2006 | Glasspool et al. | .......... 707/102 |

OTHER PUBLICATIONS

U.S. Appl. No. 10/083,075, "Application Portability and Extensibility Through Database Schema and Query Abstraction", filed Feb. 26, 2002.
U.S. Appl. No. 10/403,356, "Dealing with Composite Data Through Data Model Entities", filed Mar. 31, 2003.
U.s. Appl. No. 11/005,418, "Abstract Query Plan", filed Dec. 6, 2004.

* cited by examiner

Primary Examiner—Joon Hwan Hwang
(74) Attorney, Agent, or Firm—Patterson & Sheridan, LLP (57) ABSTRACT

Embodiments of the invention relate data retrieved from the logical fields of an abstract database using a timeline. The logical fields specified by a database abstraction model are extended to include attributes that specify where data corresponding to a logical field occurs on a timeline. Query results may be displayed by ordering query results as points (for an event) or segments (for a duration) on the timeline. Further, query processing techniques disclosed by the present invention allow users to include temporal operators such as "before", "after", "during", and "within" in an abstract query. Temporal operators provide users with the ability to include temporal relationships in an abstract query, without having to construct a complex conditional expression from more primitive logical operators (e.g., "ands" and "ors").

3 Claims, 10 Drawing Sheets

TIMELINE CONDITION SUPPORT FOR AN ABSTRACT DATABASE

CROSS-REFERENCE TO RELATED APPLICATIONS

This application is related to a commonly owned, co-pending application U.S. patent application Ser. No. 10/083,075, filed Feb. 26, 2002, entitled "Application Portability and Extensibility through Database Schema and Query Abstraction" which is incorporated herein by reference in its entirety. This application is also related to commonly assigned, U.S. patent application entitled "Dealing with Composite Data through Data Model Entities," Ser. No. 10/403,356 filed on Mar. 31, 2003 and incorporated herein by reference in its entirety, and commonly assigned, U.S. patent application entitled "Abstract Query Plan", Ser. No. 11/005,418, filed on Dec. 6, 2004, incorporated herein by reference in its entirety. This application is also related to commonly assigned, U.S. patent application Ser. No. 11/035,563 entitled "Abstract Records", filed herewith, which are each incorporated herein by reference in their entirety.

BACKGROUND OF THE INVENTION

1. Field of the Invention

The present invention generally relates to computer databases. More specifically, the present invention relates to adding timeline support and timeline operators used in constructing a query of an abstract database.

2. Description of the Related Art

Databases are well known systems for information storage and retrieval. The most prevalent type of database used today is the relational database that stores data in a set of tables that may be reorganized and accessed in a number of different ways. A relational database management system (DBMS) uses relational techniques for storing and retrieving data.

Structured Query Language (SQL) is a well known database language that that includes commands for retrieving, storing, updating, and deleting data stored in a relational database. An SQL query is constructed as a text string that must strictly conform to the grammar requirements of the SQL query language. SQL provides support for users to specify a set of conditions applied to the data retrieved by an SQL query. Typical operators include logical operators such as "and" and "or," and numerical operators, such as "equals," "greater than," and "less than" operators. From these basic operators, complex conditional expressions may be created. Building complex conditional expressions from these basic constructs, however, is often very challenging to the average user of a database. Further, an SQL query must be semantically correct to perform as desired by the user. That is, many syntactically correct SQL statements may fail to perform as desired due to semantic or logical errors in a conditional expression.

Because of this complexity, users often turn to database query applications to assist them in composing an SQL query of a relational database. For example, one technique for managing the complexity of a relational database and the SQL query language is to use database abstraction techniques. Commonly assigned U.S. patent application Ser. No. 10/083,075 (the '075 application) entitled "Application Portability and Extensibility through Database Schema and Query Abstraction," discloses a framework that provides an abstract view of a physical data storage mechanism. The framework of the '075 application provides a requesting entity (i.e., an end-user or front-end application) with an abstract representation of data stored in an underlying physical storage mechanism, such as a relational database.

Using the database abstraction model, logical fields are defined that describe data stored in an underlying database. In one embodiment of a database abstraction model, each logical field specifies an access method that specifies how to retrieve data from an underlying database system corresponding to the logical field. Users compose abstract queries by selecting logical fields and specifying conditions. The conditions available for composing an abstract query generally include the same conditional operators available in SQL. The system retrieves data from the underlying database by generating a resolved query (e.g., an SQL statement) from the abstract query. Because the database abstraction model is not tied to the syntax and semantics of an underlying database, additional operators and functions may be provided that extend the capabilities of the database abstraction model without having to modify the underlying database.

For example, users are often interested in querying data using temporal conditions, and a desirable abstract query might specify conditions that depend on when an event occurred. Consider the following query built from more basic logical and arithmetic operators:

$$\text{find} ((\text{"Test 1 Results} = 20\text{"}) \text{ AND}$$
$$(Test1.\ Testdate < Test2.testdate) \text{ AND "Test 2 results} = 50\text{"}))$$

The desired query results are not readily apparent from the query; however, the query is used to retrieve results for an intuitive temporal condition: "before." The "before" condition is captured in the middle expression "(Test1.Testdate<Test2.testdate)" "ANDed" with the test results conditions. Moreover, composing this query requires that a user correctly select the conditions, operators, and the precedence of conditions, included in an abstract query.

Accordingly, there exists a need to expand the capabilities provided by an abstract database to support timeline based conditions and to provide users with the ability to specify query conditions using temporal operators.

SUMMARY OF THE INVENTION

Embodiments of the invention relate data retrieved from the logical fields of an abstract database using a timeline. The logical fields specified by a database abstraction model are extended to include attributes that specify where data corresponding to a logical field occurs on a timeline.

One embodiment of the invention provides a method of creating a database abstraction model over an underlying physical database. The method generally includes defining a plurality of logical fields, wherein each logical field specifies at least an access method mapping the logical field to data in the underlying physical database, and wherein at least one logical field includes timeline metadata indicating where data elements retrieved for the logical field occur on a timeline. The method generally further includes, providing an abstract query building interface used to compose an abstract query from the plurality of logical fields, wherein the abstract query specifies (i) a set of conditional expressions, wherein each conditional expression includes a logical field, a conditional operator, and a comparison value, and wherein at least one conditional operator specifies a temporal operator relating the logical field and comparison value and (ii) a set of logical fields used to retrieve a set of query results that are consistent with the set of conditions.

Another embodiment of the invention provides a method for processing an abstract query that includes a temporal conditional expression The method generally includes receiving, from a requesting entity, an abstract query composed from a plurality of logical fields specified by a database abstraction model, wherein each logical field has an access method mapping the logical field to data in an underlying physical database, wherein the abstract query specifies (i) a set of conditional expressions, wherein each conditional expression includes a logical field, a conditional operator, and a comparison value, and wherein at least one conditional operator specifies a temporal operator relating the logical field and comparison value and (ii) a set of logical fields used to retrieve a set of query results that are consistent with the set of conditions. The method generally further includes generating an equivalent conditional expression corresponding to the at least one conditional expression that does not include the temporal operator, wherein the equivalent conditional expression is composed from numerical or logical operators, merging other conditional expressions specified by the abstract query with the equivalent conditional expression, and generating, from the merged conditional expressions and the set of logical fields used to retrieve a set of query results, a resolved query of the underlying physical database.

Another embodiment of the invention provides a system for processing abstract queries. The system generally includes a database system, a database abstraction model comprising definitions for a plurality logical fields, wherein each logical field specifies at least an access method mapping the logical field to data in the database system, and wherein at least one logical field includes timeline metadata indicating where data elements retrieved for the logical field occur on a timeline. The system generally further includes a runtime component configured to receive an abstract query composed from the plurality of logical fields that specifies (i) a set of conditional expressions, wherein each conditional expression includes a logical field, a conditional operator, and a comparison value, and wherein at least one conditional operator specifies a temporal operator relating the logical field and comparison value and (ii) a set of logical fields used to retrieve a set of query results that are consistent with the set of conditions.

Another embodiment provides a computer-readable medium containing a program which, when executed, on a computer system performs operations. The operations generally include providing a plurality of logical fields, wherein each logical field has an access method mapping the logical field to data in the underlying physical database, and wherein at least one logical field includes timeline metadata indicating where data elements retrieved for the logical field occur on a timeline, and providing an abstract query building interface used to compose an abstract query from the plurality of logical fields that specifies (i) a set of conditional expressions, wherein each conditional expression includes a logical field, a conditional operator, and a comparison value, and wherein at least one conditional operator specifies a temporal operator relating the logical field and comparison value and (ii) a set of logical fields used to retrieve a set of query results that are consistent with the set of conditions.

Another embodiment of the invention provides a computer-readable medium containing a program which, when executed, on a computer system performs operations. The operations generally include receiving, from a requesting entity, an abstract query composed from a plurality of logical fields specified by a database abstraction model, wherein each logical field has an access method mapping the logical field to data in an underlying physical database, and wherein the abstract query specifies (i) a set of conditional expressions, wherein each conditional expression includes a logical field, a conditional operator, and a comparison value, and wherein at least one conditional operator specifies a temporal operator relating the logical field and comparison value and (ii) a set of logical fields used to retrieve a set of query results that are consistent with the set of conditions. The operations generally further include generating an equivalent conditional expression corresponding to the at least one conditional expression that does not include the temporal operator, wherein the equivalent conditional expression is composed from numerical or logical operators, merging other conditional expressions specified by the abstract query with the equivalent conditional expression, and generating, from the conditional expressions and the set of logical fields used to retrieve a set of query results, a resolved query of the underlying physical database.

BRIEF DESCRIPTION OF THE DRAWINGS

So that the manner in which the above recited features, advantages, and objects of the present invention are attained and can be understood in detail, a more particular description of the invention, briefly summarized above, may be had by reference to embodiments thereof, illustrated in the appended drawings.

The appended drawings, however, are provided to illustrate typical embodiments of the invention and, therefore, should not be considered limiting of its scope, for the invention may admit to other equally effective embodiments.

FIGS. 3A-3C illustrate exemplary graphical user interface screens that may be used to compose an abstract query that includes temporal operators and timeline conditions, according to one embodiment of the invention.

DETAILED DESCRIPTION OF THE PREFERRED EMBODIMENTS

Embodiments of the present invention extend capabilities provided by a database abstraction model to include temporal operators used to specify temporal conditions in an abstract query. Temporal operators provide users with the ability to query temporal relationships about data without having to construct a complex conditional expression from more primitive logical operators (e.g., "ANDs" and "ORs"). For example, instead of using a complex series of conditions to construct include a temporal condition in a query, users may compose a query using temporal operators like the following:

find patients with "Test 1 results=20" before "Test 2 results =50."

This query includes the condition "before" that acts as a conditional operator relating test results based on their position on the timeline. Logical fields are modified to include attributes that specify where data corresponding to the logical field falls on a timeline are used to evaluate temporal conditions specified by an abstract query when generating query results.

In one embodiment, the database abstraction model is extended to support two types of timeline conditional operators. First, timeline "event" operators are provided. "Event" conditions query data that occupies a single point on the timeline relative to other points on the timeline. "Event" conditions allow users to add temporal operators such as "before" and "after" to an abstract query. Second, "duration" conditions query data that occurs over a specific duration of time that has a beginning and an end. "Duration" operators allow users to add temporal operators such as "during" and "within" conditions to an abstract query. In one embodiment, duration objects may be used to identify a start time, an end time, and a magnitude. Magnitude is calculated from the length of the duration segment, using the appropriate temporal units (e.g., seconds, minutes, days, etc.). The following description first describes embodiments of a data abstraction model that includes a plurality of logical fields that create an abstraction over an underlying physical database. Next, within the abstract database environment, techniques for adding timeline support and temporal operators are described.

Additionally, the following description references embodiments of the invention. The invention is not, however, limited to any specifically described embodiment. Rather, any combination of the following features and elements, whether related to a described embodiment or not, implements and practices the invention. Furthermore, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative and are not considered elements or limitations of the appended claims except where explicitly recited in a claim. Similarly, references to "the invention" shall neither be construed as a generalization of any inventive subject matter disclosed herein nor considered an element or limitation of the appended claims except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in many different ways.

The Database Abstraction Model: Physical View of the Environment

Figure 1:
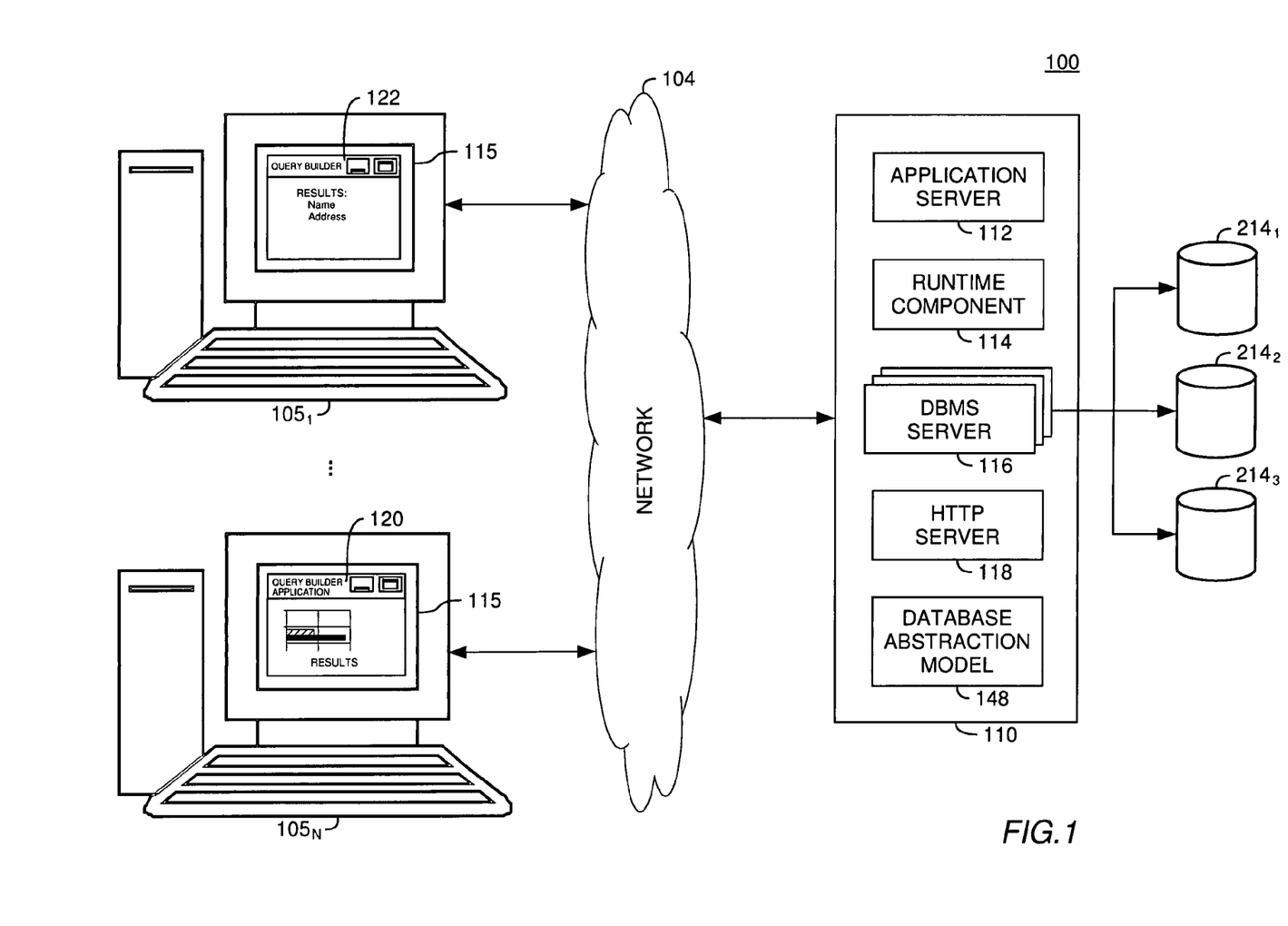
FIG. 1 illustrates a relational view of software and hardware components, according to one embodiment of the invention.

FIG. 1 illustrates a client server computer network a client/server configuration in which a database abstraction model 148 may be operated, according to one embodiment of the invention. Client computer systems $105_{1-N}$ include a network interface allowing communication with other systems over network 104. The network 104 may comprise a local area network wherein both the client system 105 and the server system 110 reside in the same general location, or may comprise network connections between geographically distributed systems, including network connections over the Internet. Client systems 105 generally include a central processing unit (CPU) connected via a bus, to memory and storage (not shown). Client systems 105 are running an operating system, (e.g., a Linux® distribution, Microsoft Windows®, IBM's AIX®, FreeBSD, and the like) used to manage the interaction between hardware components and higher-level software applications running on client system 105.

In one embodiment, a user establishes a network connection between one of client systems 105 and server system 110. Such a connection may include a login process wherein a user authenticates the user's identity to the server system 110 using, for example, a username and password or other authentication schemes (e.g., digital certificates or biometric authentication). Systems that do not require authentication are also contemplated. The server system 110 may include computer hardware components similar to those used by client system 105. Accordingly, the server system 110 generally includes a CPU, a memory, and a storage device connected to a bus (not shown). The server system 110 is also running an operating system, (e.g., a Linux® distribution, Microsoft Windows®, IBM's AIX® or OS/400®, FreeBSD, and the like) used to manage the interaction between hardware components and software applications.

The computer systems illustrated in FIG. 1, however, are merely exemplary of one hardware/software configuration. Embodiments of the present invention may be implemented using other configurations, regardless of whether the computer systems are complex, multi-user computing systems, such as a cluster of individual computers connected by a high-speed network, single-user workstations, or network appliances lacking non-volatile storage of their own. Additionally, although described herein using a client/server network configuration, embodiments using distributed computing or peer-to-peer processing networking techniques are contemplated.

In one embodiment, users interact with the server system 110 using a graphical user interface (GUI). In a particular embodiment, GUI content may comprise HTML documents (i.e., web-pages) rendered on a client computer system $105_1$ using web-browser 122. In such an embodiment, the server system 110 includes a Hypertext Transfer Protocol (http) server 118 (e.g., a web server such as the open source Apache web-sever program or IBM's Web Sphere® program) configured to respond to HTTP requests from the client system 105. The web-pages themselves may be static documents stored on server system 110 or generated dynamically using well-known application servers 112 interacting with web-server 118. The web-pages may include pages that present a query-building interface 115 to a user interacting with the system 110.

Alternatively, or in addition, client application 120 may provide a database front-end, or query application program running on client system $105_N$. In either case, the query building interface 115 allows users to compose an abstract query. The resulting query is generally referred to herein as an "abstract query" because it is composed from logical fields rather than by direct reference to data entities in underlying databases covered by the database abstraction model 148. The database abstraction model 148 specifies the logical fields available for query composition. Once composed, the abstract query is submitted to the runtime component 114 which generates a resolved query of the databases 214 and returns query results to the requesting entity.

As illustrated in FIG. 1, server system 110 may further include runtime component 114 and DBMS server 116. Each of these components may comprise a software program executing on the server system 110. DBMS server 116 generally comprises a software application configured to manage databases $214_{1-3}$. By way of illustration, the individual databases accessible through DBMS server 116 may include a relational database $214_2$ queried using an SQL query, or an XML database $214_1$ queried using an XML query. The invention is not; however, limited to any particular physical database storage mechanism and may readily be extended to operate on other such data storage mechanisms, whether currently known or unknown. Accordingly, data storage mechanism $214_3$ illustrates other storage mechanisms managed by a DBMS server 116. Further, databases 214 may accessible on the local storage system of server system 110, or may be accessed over network 104.

In one embodiment, a user composes an abstract query by specifying a model entity being queried, a selection of logical fields, and conditions applied against the fields, including temporal conditions. The database abstraction model 148 specifies a mapping from each logical field to data in databases 214, along with the relationships between logical fields. In one embodiment, each logical field specifies includes a name and an access method. The access method identifies the underlying database (e.g., databases $214_{1-3}$) where data for the logical field is located, as well as a method to access the data in the underlying physical storage mechanism. In addition, each logical field may provide metadata indicating whether the logical field may be used in a conditional expression that includes a timeline operator. Further, each logical field may include information used to determine where data retrieved for the logical field falls on a timeline. Timeline metadata is described in greater detail below in conjunction with FIG. 2B.

The runtime component 114 may be configured to generate a query consistent with the physical representation of the data contained in one of databases 214. In other words, the runtime component is the "transformational engine" used to generate a resolved query (e.g., an SQL statement) from an abstract query. The runtime component 114 generates a physical query issued against the underlying physical storage mechanism. In one embodiment, the runtime component 114 generates an intermediate representation of the abstract query, such as an abstract query plan, and then uses the intermediate representation to generate a resolved query. Detailed examples of abstract query plans are described in commonly assigned U.S. patent application entitled "Abstract Query Plan," incorporated herein by reference in its entirety.

Figure 2A:
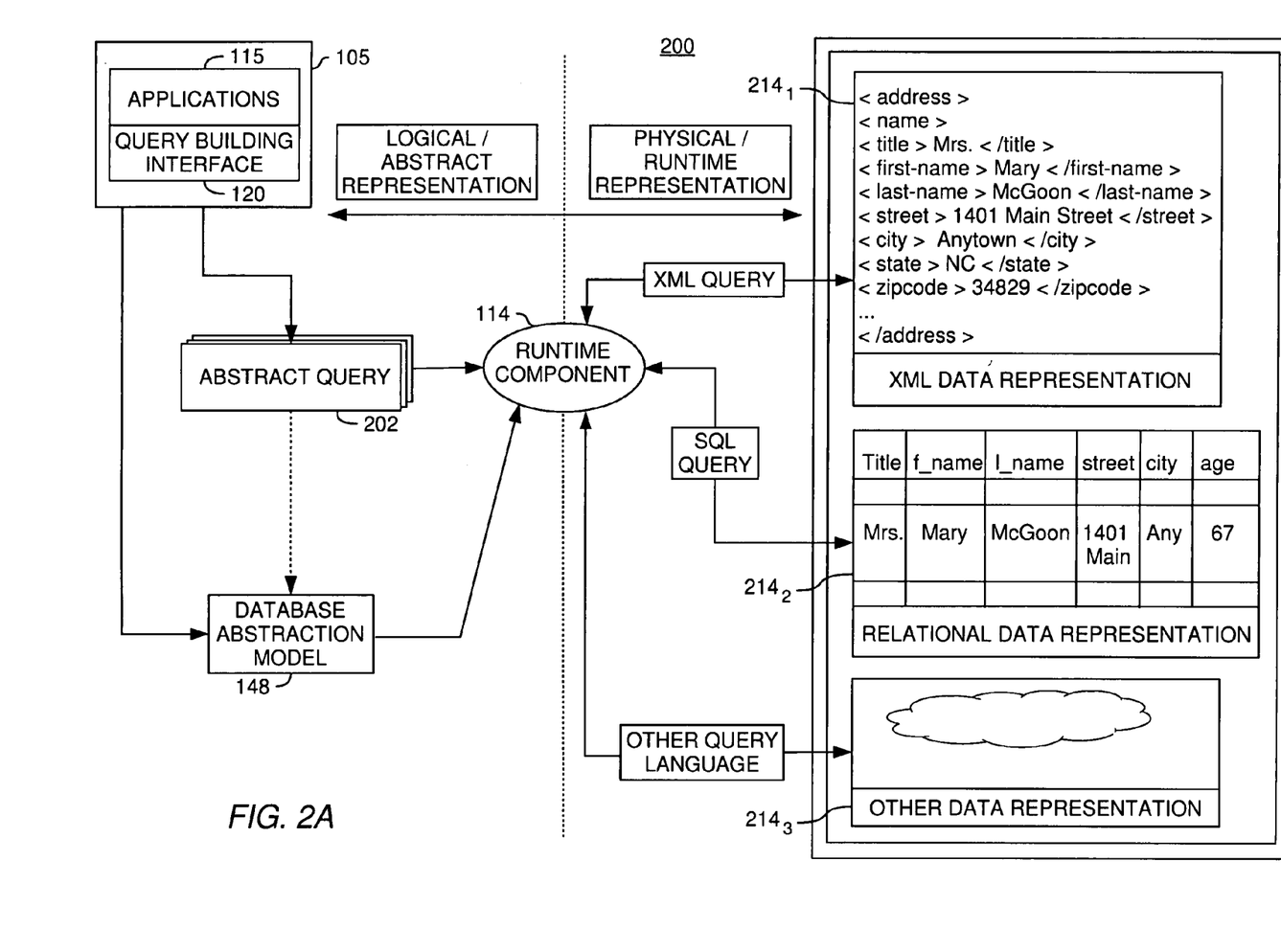
FIG. 2A illustrates logical and physical representation of the database abstraction model environment, according to one embodiment of the invention.

FIG. 2A illustrates a plurality of related hardware and software components, along with the transformation between the abstract view provided by the database abstraction model 148 (the left side of FIG. 2A), and the underlying database mechanisms 214 used to store data (the right side of FIG. 2A).

In one embodiment, a requesting entity composes an abstract query 202 using query building interface 115. The query building interface 115 may be provided by the application 120, or may be a web-page rendered on web browser 122. The logical fields used to compose the abstract query 202 are defined by the database abstraction model 148. In general, the database abstraction model 148 provides an abstract representation of the underlying physical database. The runtime component 114 is the connection between the abstract representation provided by the database abstraction model 148, and the underlying physical database. For example, the runtime component 114 may transform abstract query 202 into an XML query that queries data from database $214_1$, an SQL query of relational database $214_2$, or other query composed according to another physical storage mechanism (whether currently known or later developed).

The Database Abstraction Model: Logical View of the Environment

In one embodiment, users select the logical fields to include an abstract query by interacting query building interface 115. Additionally, users may specify query conditions as part of generating an abstract query. A conditional expression included in the query selection conditions consists of a field name (of a logical field), a comparison operator (=, >, <, AND, OR, etc) and a value expression (what is the field being compared to). The result specification 206 identifies the logical fields for which data is retrieved as query results. The actual data returned satisfies the conditional expressions specified by an abstract query. In addition to the numerical and logical comparison operators, embodiments of the invention provide temporal operators, including "before," "after," "during," and "within" that may be included in a conditional expression. These temporal operators eliminate the need for a complex series of conditional expressions otherwise required to compose an abstract query with temporal constraints. Once an abstract query is submitted for processing, the runtime component 114 may be configured to generate an equivalent conditional expression using the more basic logical and numerical operators as part of query processing.

In one embodiment, a user also specifies what model entity is being queried as part of the query building process. Rather than query relational database tables, model entities allow a user to build a query by composing a question about the model entity. For example, consider a relational database storing test results for patients. To the database, data is a set of rows stored in tables; however, to a user, the query is about patients. What model entities are available is defined by the framework provided by the database abstraction model 148. The runtime component 114 may use the model entity selected for an abstract query in constructing an abstract query plan. Detailed examples of model entities are described in further detail in a commonly owned, pending application entitled "Dealing with Composite Data through Data Model Entities," application Ser. No. 10/403,356 filed on Mar. 31, 2003 and incorporated by reference herein in its entirety.

Figure 2B:
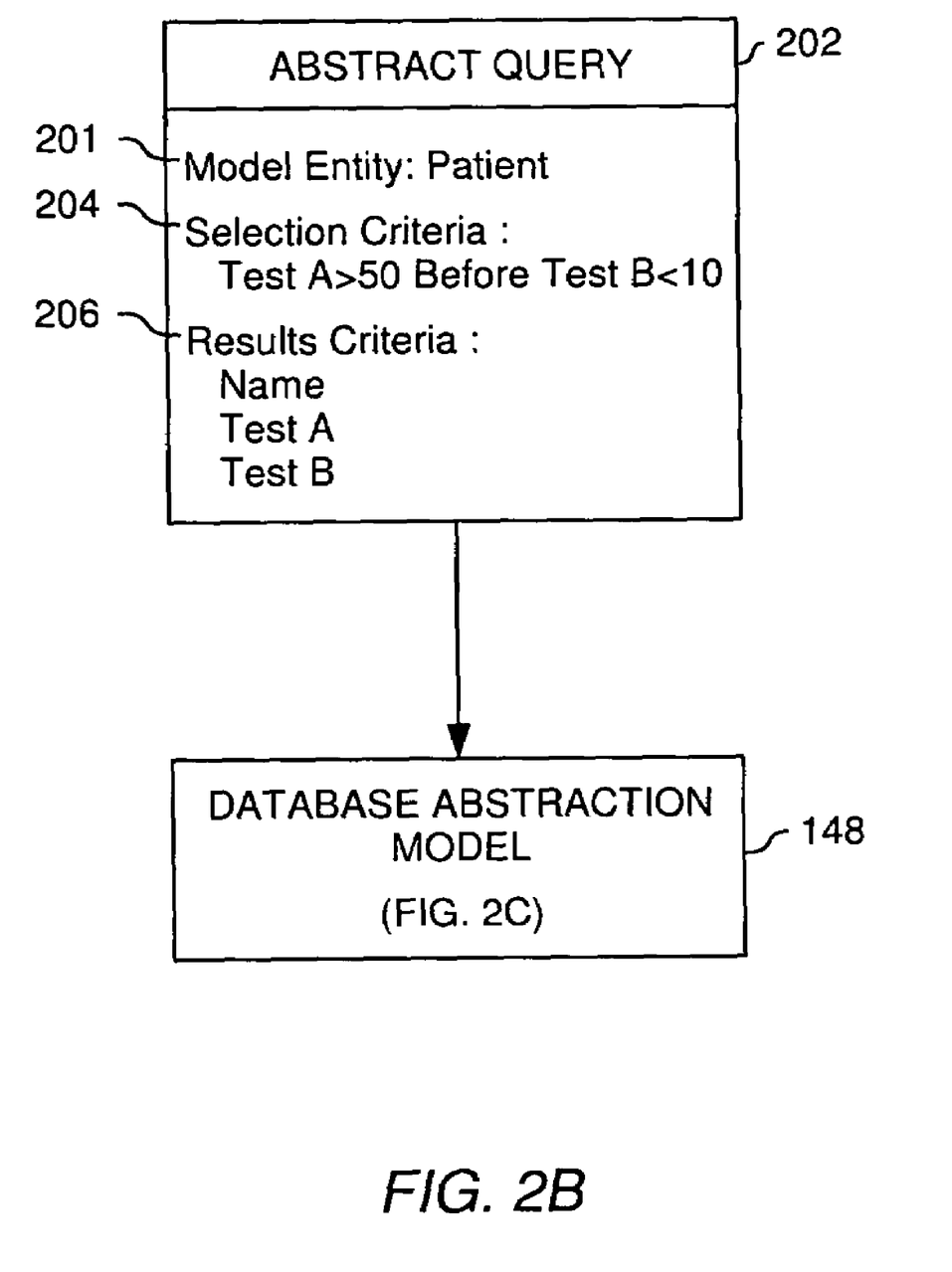
FIGS. 2B and 2C illustrate an abstract query and corresponding data repository abstraction component, according to one embodiment of the invention.

FIG. 2B further illustrates one embodiment of a data abstraction model 148 that includes a plurality of logical field specifications $208_{1-7}$ (seven shown by way of example.) Collectively, logical field specifications 208 create an abstraction over a particular underlying physical database and database schema. In one embodiment, multiple data repository abstraction models may be constructed over the same set of underlying physical storage mechanisms. Accordingly, database abstraction models may be constructed that expose different portions of data to different users, or database abstraction models constructed over the same data may differ, and may be customized to the needs of a particular user (or group of users).

The logical fields shown in FIG. 2B illustrate a database abstraction model constructed over a relational database. That is, the access methods included in field specifications 208 define a mapping between the logical field and the tables and columns of the relational database (e.g., database $214_2$ from FIG. 2A). In one embodiment, the database abstraction model 148 provides a logical field specification 208 for each logical field available for composition of an abstract query (e.g., abstract query 202). The logical field specification 208 stores a definition for each logical field, and any associated metadata (e.g., timeline metadata 215) used by the runtime component 114 as part of query processing. As illustrated, each field specification 208 identifies a logical field name $210_{1-7}$ and a reference to an associated access method $212_{1-7}$. Depending upon the number of different types of logical fields, any number of access methods is contemplated. As illustrated in FIG. 2B, access methods for simple, filtered, and composed fields are provided.

Field specifications $208_1$, $208_2$, and $208_5$ each provide a simple access method $212_1$, $212_2$, and $212_5$. The simple access method provides a direct mapping to a particular entity in the underlying physical data representation. The simple access methods $212_1$, $212_2$, and $212_5$ map logical fields $208_1$, $208_2$, and $208_5$ to an identified database table and column of database 212. For example, the simple field access method $212_1$, shown in FIG. 2B maps the logical field name $210_1$ ("FirstName") to a column named "$f_{13}$name" in a table named "Demographics." Logical field specifications 208 may also include metadata indicating how a logical field is related to other entities in the data abstraction model 148. In one embodiment, timeline metadata 215 is used to place data corresponding to the logical field on a timeline.

For example, timeline metadata $215_5$, specifies that the logical field $208_5$ "pregnancy" occurs on a timeline starting at an estimated date of conception. The "magnitude" (i.e., the length of the duration event) is also specified by timeline metadata $215_5$. The magnitude associated with the "pregnancy" logical field $208_5$ begins with a conception date and ends with a delivery date. The start point marks the beginning of the duration event. A duration operator allows intuitive queries including:

find patients with ("Test A result value>50") during pregnancy; or find patients with ("test A results value>50") within 3 months of pregnancy.

A query that specifies a duration operator will retrieve query results for data elements that occur during the duration segment. Fields $208_3$ and $208_7$ include timeline metadata $215_3$ and $215_7$ specifying that each instance of a medical test is an event on the timeline. The timeline metadata for an "event" specifies how to determine what point on the timeline a particular instance occurs, for example, the date of the particular medical test. Using the timeline event operators, users may compose fields like the following:

find patients with ("Test A result value>50") before ("Test B result<20")

find patients with ("Test A result value<50") after ("Age=19").

Field specification $208_3$ exemplifies a filtered field access method $212_3$. Filtered access methods identify an associated physical entity and provide rules used to define a particular subset of items within the physical data representation. Consider, for example, a relational table storing test results for a plurality of different medical tests. Logical fields corresponding to each different test may be defined, and the filter for each different test is used to identify what particular test is associated with a logical field. An example is provided in FIG. 2B in which the access method for filtered field $212_3$ maps the logical field name $210_3$ ("Hemoglobin Test") to a physical entity in a column named "Test_Result" in a table named "Tests" and defines a filter "Test_ID='1243.' Accordingly, the filtered field acts as selection criteria used to restrict items from a larger set of data, without the user having to know the specifics of how the data is represented in the underlying physical storage mechanisms or to specify the selection criteria as part of the query building process.

Field specification $208_4$ exemplifies a composed access method $212_4$. Composed access methods generate values from one or more physical data items, or data returned by other logical fields, using an expression supplied as part of the access method definition. In this way, information which does not directly exist in the underlying data representation may be computed and provided to a requesting entity. In the example illustrated in FIG. 2B the composed field access method $212_3$ maps the logical field "Age" to another logical field named "birthdate" (not shown). The composition expression is used to compute a value for the composed field. In this example, an age value is computed by subtracting the current date from the birthdate value returned by the "birthdate" logical field.

By way of example, field specifications 208 shown in FIG. 2B are representative of logical fields mapped to data represented in relational data representation $214_2$. However, other instances of the data abstraction model 148 or other logical field specifications may map to other physical data representations (e.g. databases $214_1$ or $214_3$ illustrated in FIG. 2A).

Figure 2C:
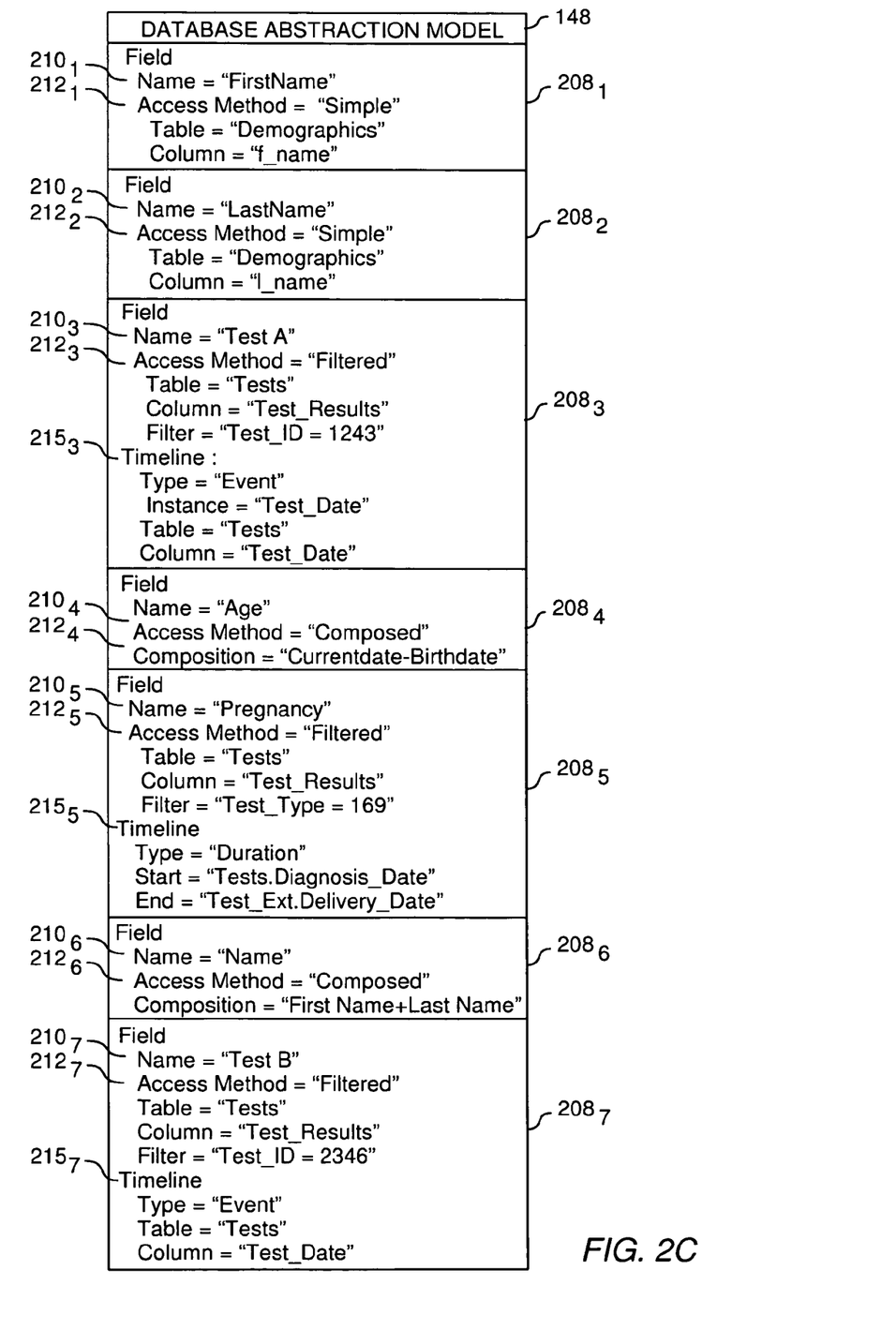

FIGS. 2B and 2C illustrate an exemplary abstract query 202 (FIG. 2B) composed on the basis of the data abstraction model 148 (FIG. 2C). Abstract query 202 includes a conditional expression that specifies a temporal operator, i.e., "before". The query includes selection criteria 204 designed to retrieve data from logical fields about patients who had a high value reported for medical Test A, before having a low value reported for medical Test B. Abstract query 202 includes the temporal operator "before" as part of the selection criteria 204. The actual data retrieved may include data from multiple tests. That is, a particular patient may have had multiple high test results for Test A before having a low test result for Test B." In addition, abstract query 202 specifies a model entity 201 that specifies the focus for abstract query 202; in this case, "patients." Results criteria 206 specifies that a patients name, along with the values for Test A and Test B that satisfy the conditions should be retrieved as query results.

An illustrative abstract query corresponding to abstract query 202 is shown in Table I below. In this example, the abstract query 202 is represented using XML. In one embodiment, application 120 may be configured to generate an XML document to represent an abstract query composed by a user interacting with the query building interface 115. Those skilled in the art will recognize that XML is a well known language used to facilitate the sharing of structured text and information, other languages, however, may be used.

TABLE I

QUERY EXAMPLE

```
001  <?xml version="1.0"?>
002  <!--Query string representation: ("Find Patients with
003                "Test A > 50" BEFORE "TEST B < 10)
004  <QueryAbstraction>
005    <Selection>
006      <Condition internalID="4">
007        <Condition field="Test A" operator="GT" value="50"
008  internalID="1"/>
009        <Condition field="Test B" operator="LT" value="10"
010  internalID="3" relOperator="BEFORE"></Condition>
011      </Condition>
012    </Selection>
013    <Results>
014      <Field name = "Name"/>
015      <Field name = "Test A Results"/>
016      <Field name = "Test B Results"/>
017    </Results>
018    <Entity name="Patient" >
019      <EntityField required="Hard" >
020        <FieldRef name="data://Demographic/Patient ID" />
021          <Usage type="query" />
022        </EntityField>
023    </Entity>
024  </QueryAbstraction>
```

Lines 5-12 correspond to the selection conditions 204 specified by abstract query 202. Line 010 specifies the "BEFORE" temporal operator should be used to evaluate the conditions specified by lines 007-008 and 009-010. Lines 013-017 specifies the logical fields included in the results section 206 and lines 018-023 specify that the query is a query of the "patient" model entity.

Database Abstraction Model: Building Queries with Temporal Conditions

Figure 3A:
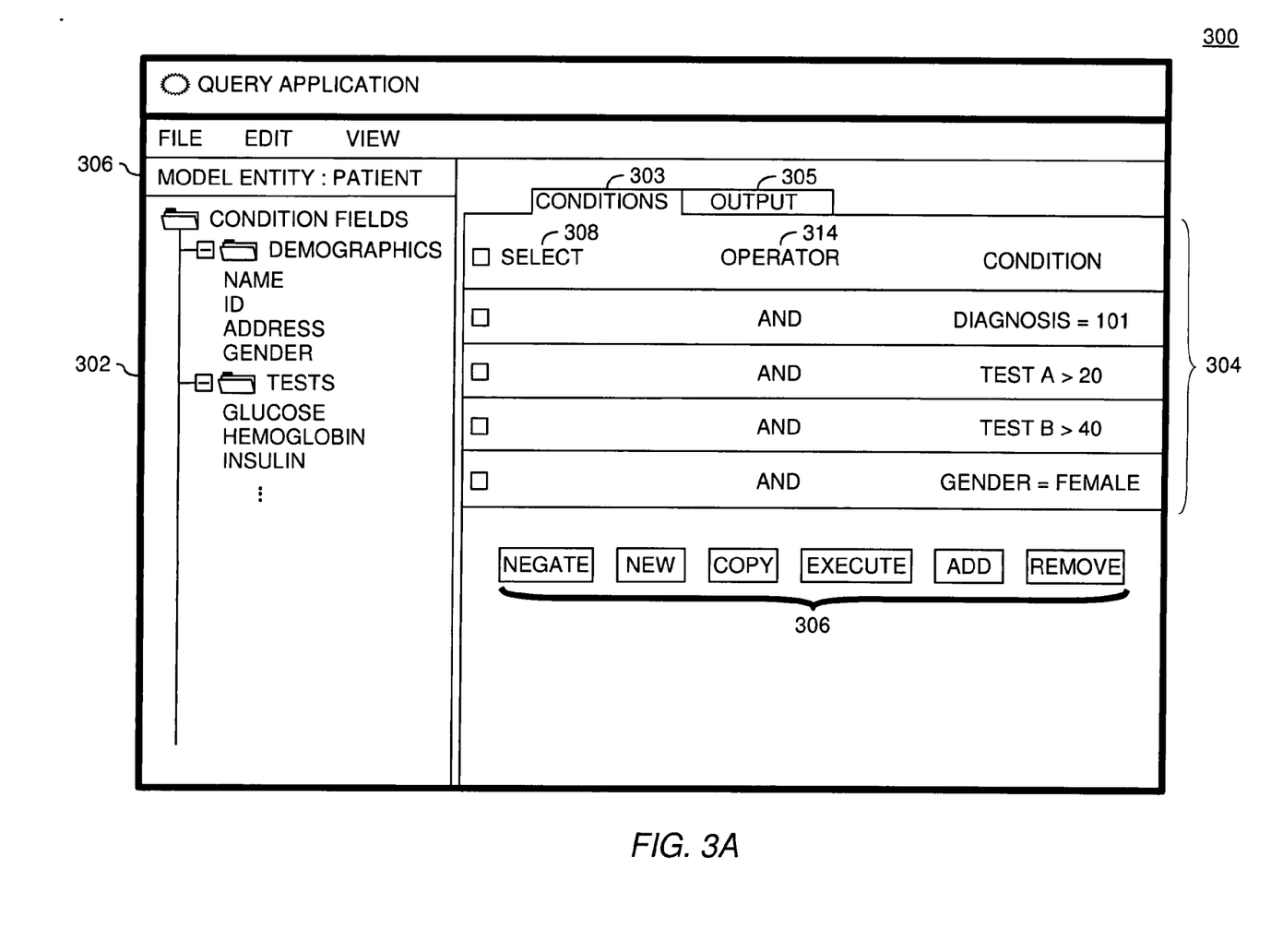

FIG. 3A illustrates an exemplary graphical user interface screen 300 used to compose an abstract query, e.g., abstract query 202. Screen 300 may be presented as part of query building interface 115 on browser 122 or on query building application 120. Model Entity specification 306 indicates that the current query being composed relates to the "patient" model entity. Using this selection, the logical fields, conditions, and attributes that may be specified for the abstract query are all associated with a query about a patient. In one embodiment, the conditions section 302, lists the logical fields that may be used as part of a condition. Accordingly, for the "patient" model entity, conditions section 302 illustrates logical fields related to patient demographic information and test results. In one embodiment, a user interacts with interface 115 using well known GUI control objects (e.g., buttons, radio buttons, menus, drop-down boxes, and the like). As illustrated, conditions tab 303 is selected, providing a user with an interface to modify the conditions section of an abstract query. Query output tab 305 allows a user to switch to a view where a user can add, remove, or modify the logical fields included as part of query results section 206.

Condition section 304 illustrates the conditions currently included in an abstract query. Once complete, the abstract query may be executed by submitting the query for processing using the "submit" button (one of buttons 306). Each of the conditions specified in the current query may be edited using selection boxes 308. In the state illustrated by screen 300, the abstract query includes the conditions: "Diagnosis=101," "Test A>20," "Test B<40" and "Gender=female." FIGS. 3B and 3C further illustrate GUI screen 300 as a user interacts with abstract query interface 115 to modify the abstract query 202. In particular, the abstract query 202 is modified to include the temporal conditions provided by embodiments of the present invention.

FIG. 3B illustrates a user interacting with screen 300 to specify an "event" type timeline condition. Specifically, FIG. 3B illustrates screen 300 after a user has selected query condition #2 using checkbox 310. Accordingly, conditions section 304 expands to present the user with the attributes available for the "Test A" logical field present in query condition #2. Drop down box 312 illustrates the conditions that may be applied for this logical field. Currently, the "before" operator is selected, and is applied to condition #3, "Test B>40" in this example. In one embodiment, a user first specifies a condition, e.g., "Test A>20." Subsequently, a user may then link different conditions together using operators 314 that associate different conditions together. After specifying the attributes for condition #2, a user may apply the selected conditions using button 320.

Figure 3C:
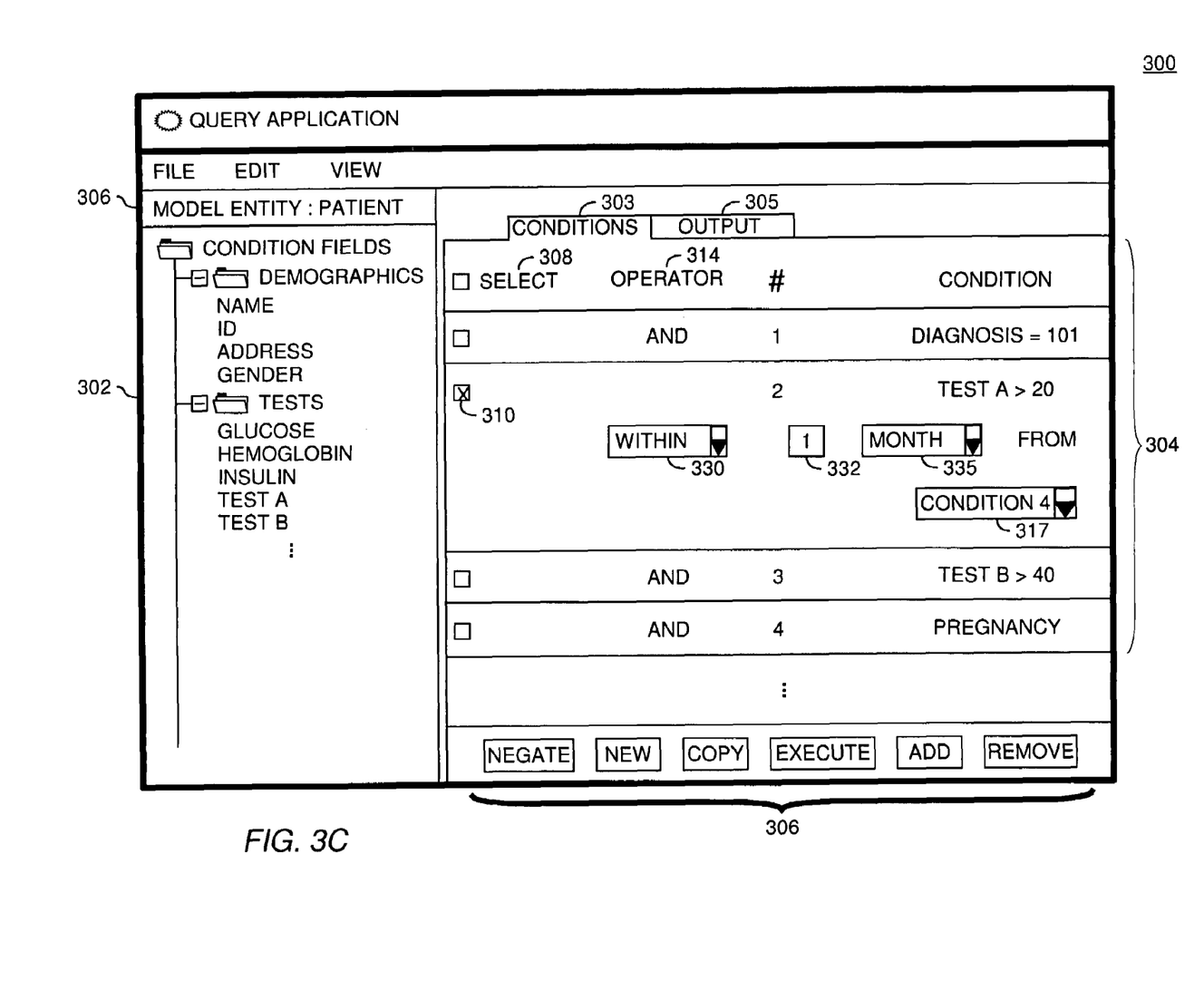

FIG. 3C illustrates a user interacting with screen 300 to specify a "duration" type timeline condition. Like FIG. 3B, FIG. 3C illustrates a user modifying condition #3 using checkbox 310. FIG. 3C, however, illustrates a user specifying a "duration" temporal operator. As illustrated, a "within" operator 330 is used to relate the "test A>20" condition with the "pregnancy" condition specified by condition #4. When a user selects the "within" operator, the interface provides additional controls for a user to specify timescale 325, value 332, and the condition 317 to relate the "within" operator with another condition. As illustrated, condition #2 uses the "within" operator 330 to specify that the "test A>20" condition must occur within 1 month (as specified in box 335) of condition #4 (specified in dropdown box 317). Thus, the conditions illustrated by query condition #2 and query condition #4 correspond to the query: "find patients with a "Test A>20" value that occurred within three months of the condition #4 duration event, "pregnancy." After all the conditions are specified, an abstract query that includes temporal events may be submitted to the runtime component to retrieve query results.

Figure 4:
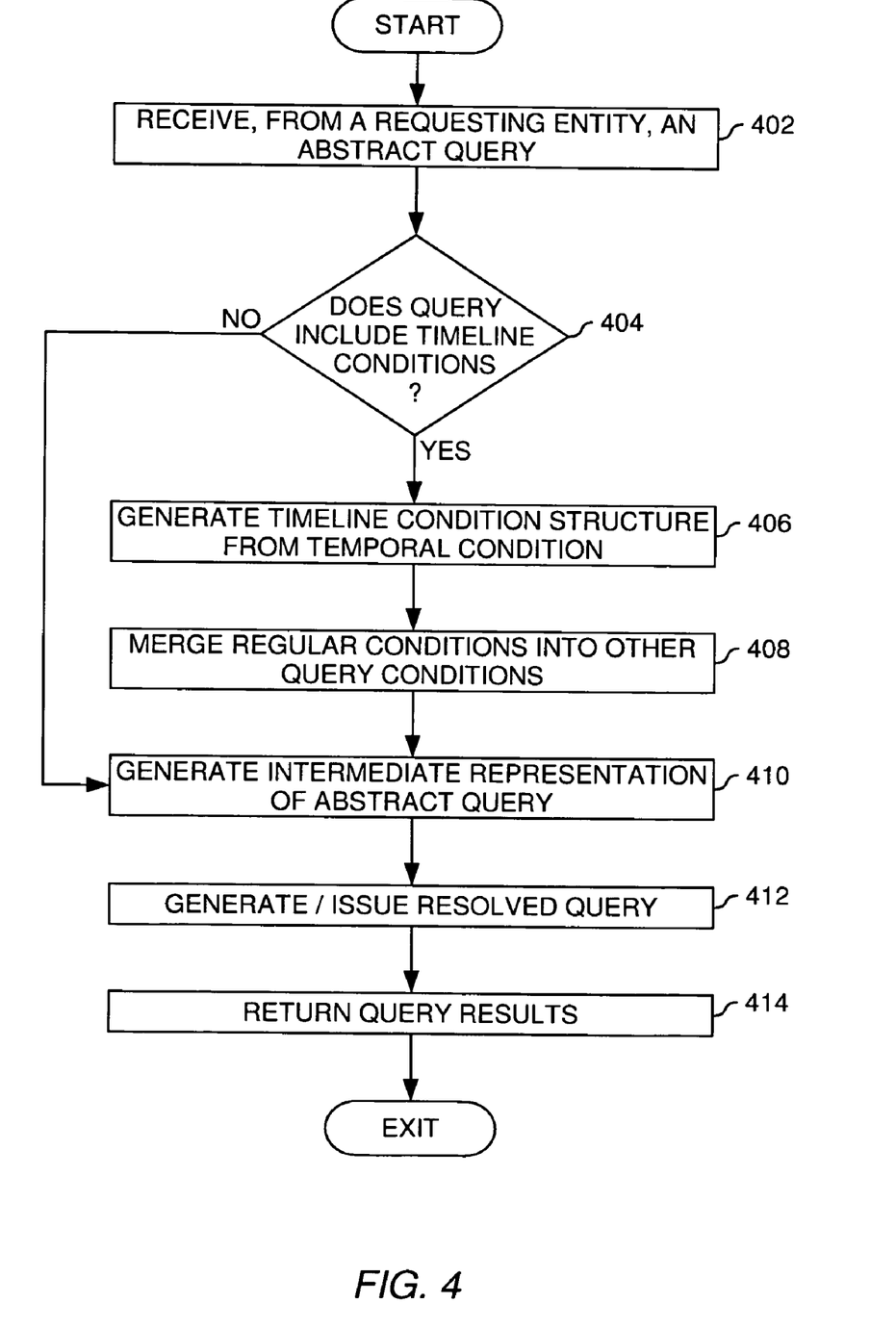
FIG. 4 illustrates a method for processing an abstract query that includes temporal operators as part of the selection conditions, according to one embodiment of the invention.

Database Abstraction Model: Processing an Abstract Query with Temporal Conditions FIG. 4 illustrates operations 400 of runtime component 114, according to one embodiment of the invention. As described above, the runtime component 114 is configured to receive an abstract query, and in response, to generate a query of the database system underlying the database abstraction model 148. Operations 400 begin at step 402 wherein a runtime component 114 receives an abstract query composed by a user interacting with query building interface 115. In one embodiment, the abstract query is transmitted across network 104 to system 110 using well-known data communications protocols.

In one embodiment, the runtime component 114 receives an abstract query in a structured form, such as XML, like the query illustrated in Table I. Once received, at step 404, runtime component 114 determines whether the abstract query includes any timeline conditions or temporal operators. If not, operations 400 proceed to step 410, and continue with no timeline support steps. Otherwise, operations 400 proceed to step 406 and process the timeline conditions and temporal operators included in the abstract query. Steps 406 and 408 replace the temporal operator with a corresponding set of logical operators.

Figure 5:
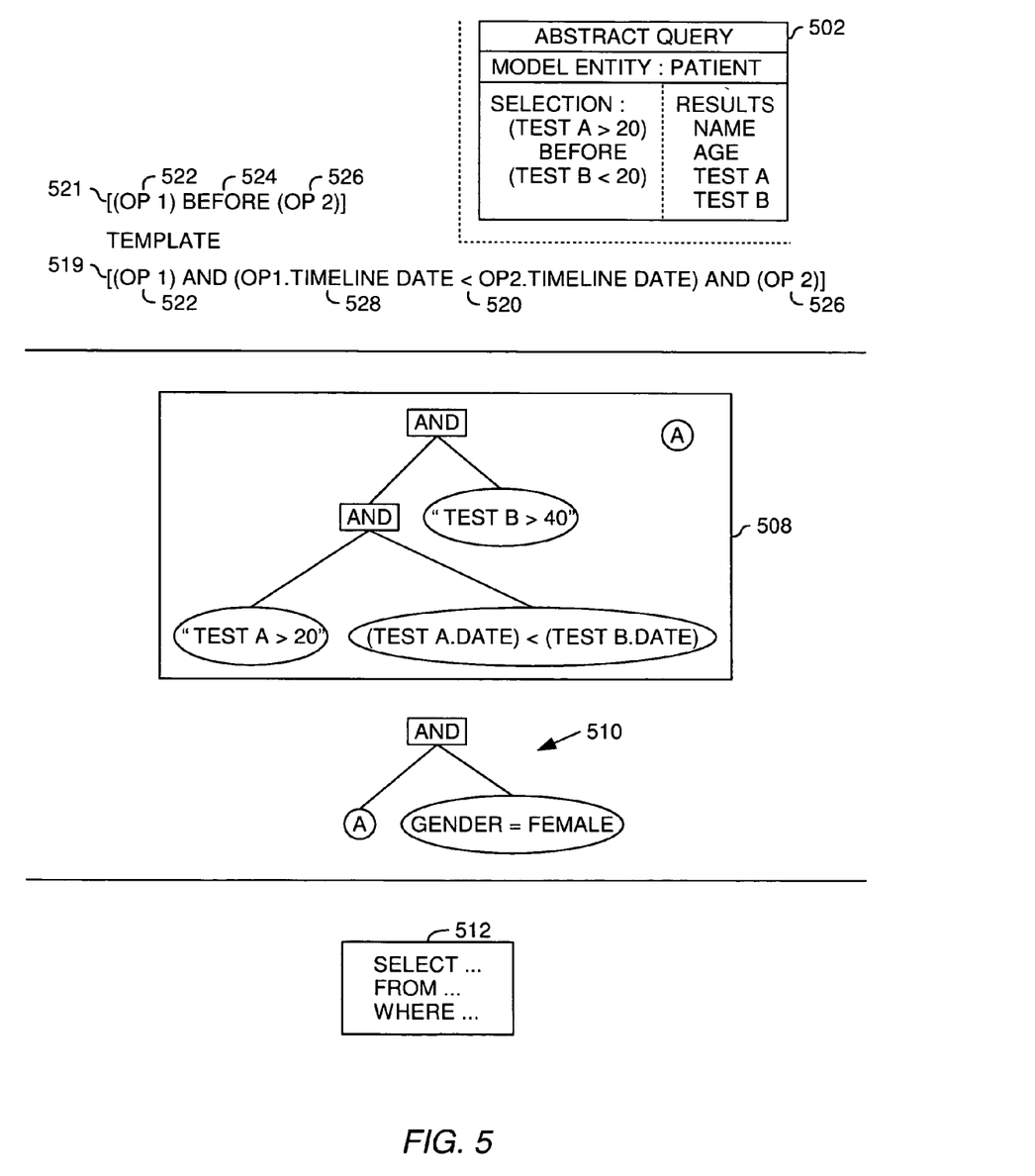
FIG. 5 illustrates an abstract query 502, and a conditional expression template used to transform a temporal conditional expression into a conditional expression constructed from logical operators.

At step 406, the runtime component 114 generates a timeline condition structure corresponding to the temporal condition included in an abstract query. For example, FIG. 5 illustrates abstract query 502 (based on the abstract query illustrated in FIG. 3B), that includes a "before" temporal condition. Abstract query 502 is directed to the "patient" model entity and is configured to retrieve female patients with a ("test A>20") test result value that occurred before a ("test B>40") test result value. The "before" operator 509 connects operands 505 and 507. In one embodiment, temporal condition 504 is used to generate a combination of logical and numerical conditions that specify an equivalent conditional expression using "AND" and "OR" logical operators.

Conditions template 521 illustrates an expression that describes an equivalent form of the "before" temporal condition expression. As illustrated, template 521 includes two operators: "op1" 522 and "op2" 526 connected using the "before" operand 524. A second condition expression 519 illustrates an equivalent expression built using the "op1" and "op2" operands that replaces the "before" operator with an equivalent set of "and" operators. The "before" portion of the temporal condition is captured by inequality operator "<" 520. An "after" condition would simply reverse the inequality operator from "<" to ">" in expression template 521. Condition templates for "during" and "while" operators are similarly constructed and populated with information from an abstract query that includes a "duration" type operator.

In one embodiment, the runtime component 114 uses template expression 521 to generate decision tree 508. Temporal decision tree 508 illustrates the condition expression 521 populated with the actual operands 505 and 508 from abstract query 502. Returning to FIG. 4, at step 408, temporal conditions tree 508 may be merged with other conditions included in the abstract query. Accordingly, query conditions tree 510 illustrates temporal condition tree 508 connected to the "gender=female" condition specified in the abstract query through the "and" logical operator.

Once any temporal conditions included in the abstract query have been replaced with equivalent expressions, query processing proceeds to step 410 of operations 400. In one embodiment, at step 410, the runtime component is configured to generate an intermediate representation of the abstract query, such as an abstract query plan.

In one embodiment, an abstract query plan includes a combination of abstract elements from the data abstraction model 148 and elements relating to the underlying physical data storage mechanism. For a data abstraction model constructed over a relational database, an abstract query plan includes all the information about what relational tables need to be available, and how to join the tables together (i.e., the relationships between the tables or between the logical fields, conditions on data retrieved.) From this the runtime component generates an SQL statement 512 used to query database 214 at step 412. Abstract query plans, and query processing are further discussed in a commonly assigned U.S. patent application Ser. No. 11/005,418 filed on Dec. 6, 2004 entitled "Abstract Query Plan," incorporated herein by reference in its entirety.

Figure 6:
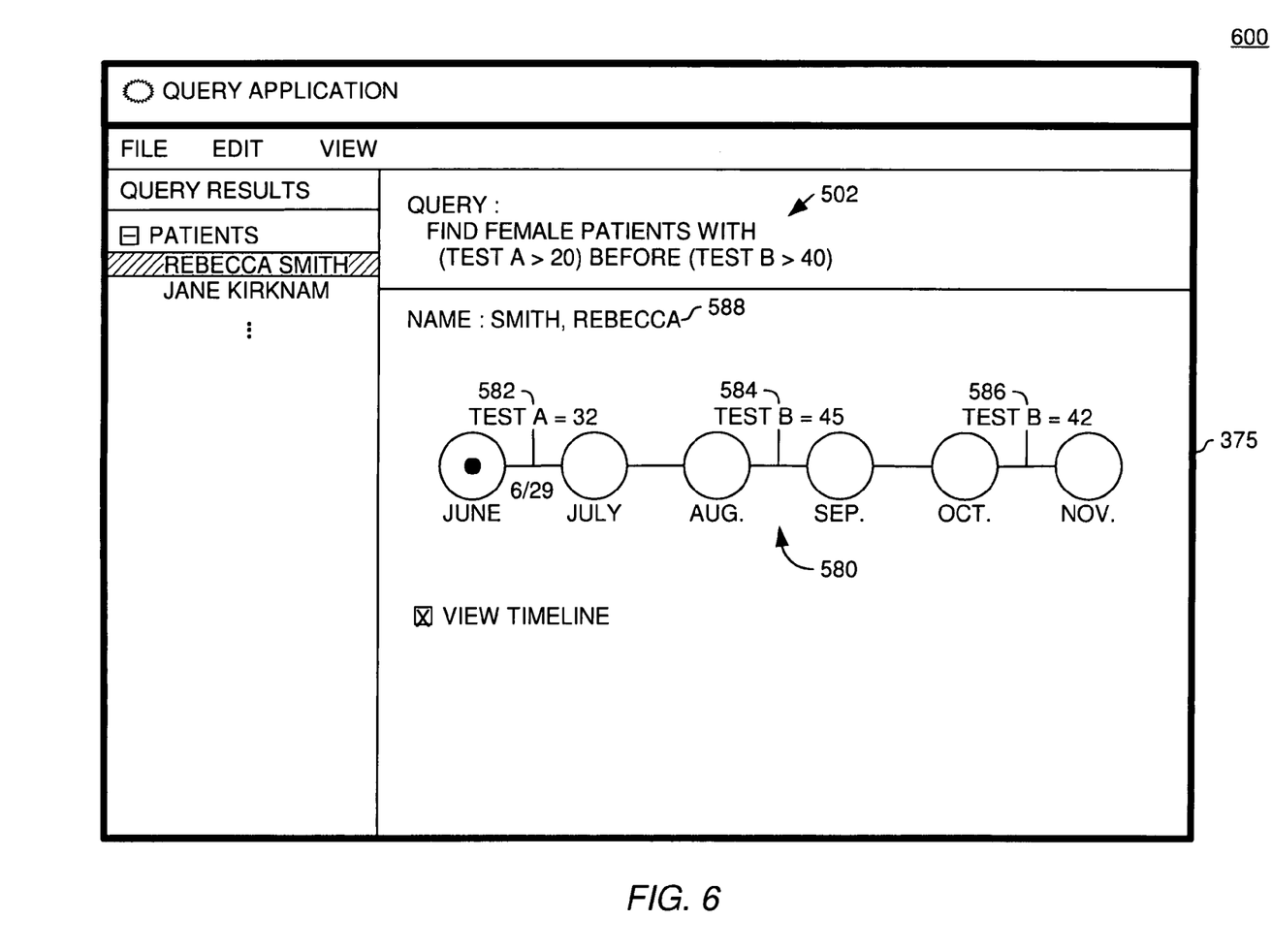
FIG. 6 illustrates an exemplary graphical user interface screens that may be used to display query results on a timeline, according to one embodiment of the invention.

After results are retrieved for the abstract query, results are returned to the user. In one embodiment, query results are rendered using a timeline display. For example, FIG. 6 illustrates a graphical user interface screen 600 displaying query results. Query results section 600 identifies what patients that were retrieved. That is, it displays the instances of the model entity that satisfied the conditions of the abstract query. In one embodiment, data related to a model entity is stored using an abstract record. An abstract record identifies what logical fields exist in the database abstraction model that map to data related to a particular model entity (e.g., patients). Abstract records are described in a commonly assigned, U.S. patent application Ser. No. 11/035,563, field herewith entitled "Abstract Records," which is incorporated herein by reference in its entirety. Display area 375 displays query results retrieved for a particular patient 588 on timeline 380. Test results 382, 384, and 386 satisfied the conditions of abstract query 502 for a particular patient 588 and are placed on a graphical representation 580 of the timeline.

CONCLUSION

Timeline events and temporal operators greatly simplify the query composition process. Rather than use a complex set of simple operators, users may select the desired temporal operator to apply to the conditions of an abstract query. In one embodiment of the invention, two types of temporal operators are provided. "Event" type operators place data retrieved for a logical field at a specific point on a timeline. "Duration" type operators place data retrieved for a logical field on a segment of the timeline. The runtime component 114 may be configured to process the temporal operator by replacing a temporal expression with a more complex, but logically equivalent, expression composed from, e.g., "AND" and "OR" operators. The abstract query is then used to generate a resolved query of the database system covered by the database abstraction model 148 and to retrieve a set of query results. These results may be displayed by placing data elements on a timeline relative to one another, according to the timeline metadata 215 included in the logical field specifications.

While the foregoing is directed to embodiments of the present invention, other and further embodiments of the invention may be devised without departing from the basic scope thereof, and the scope thereof is determined by the claims that follow.

What is claimed is:

1. A method for processing an abstract query that includes a temporal conditional expression, comprising:

receiving, from a requesting entity, an abstract query composed from a plurality of logical fields specified by a database abstraction model, wherein each logical field has an access method mapping the logical field to data in an underlying physical database, wherein the abstract query specifies (i) a set of conditional expressions, wherein each conditional expression includes a logical field, a conditional operator, and a comparison value, and wherein at least one conditional expression specifies a temporal operator relating the logical field and comparison value, and (ii) a set of logical fields defining result fields for which query results, satisfying the set of conditional expressions, are returned;

generating an equivalent conditional expression corresponding to the at least one conditional expression, wherein the generated equivalent conditional expression does not include the temporal operator, and wherein the equivalent conditional expression is composed from numerical or logical operators;

merging other conditional expressions specified by the abstract query with the equivalent conditional expression;

generating, from the merged conditional expressions and the set of logical fields used to retrieve a set of query results, a resolved query of the underlying physical database, wherein generating an equivalent conditional expression, merging other conditional expressions with the equivalent conditional expression, and generating a resolved query of the underlying physical database are done by operation of a computer processor;

issuing the resolved query to the underlying physical database to retrieve the set of query results; and displaying a graphical representation of the set of query results that indicates a position of data elements included in the query results on a timeline according to a timeline metadata included in at least one logical field.

2. The method of claim 1, wherein the temporal operator comprises one of a "before" operator and an "after" operator specifying that data corresponding to the logical field included by the at least one conditional expression occurred at a single point on the timeline before or after the comparison value, respectively.

3. The method of claim 1, wherein the temporal operator comprises a "during" or "within" operator specifying that data corresponding to the logical field occurs at any point on a segment of the timeline or within a certain distance from another point on the timeline.

* * * * *